United States Patent
Tabata (10) Patent No.: US 8,156,925 B2
(45) Date of Patent: Apr. 17, 2012

(54) EXHAUST GAS RECIRCULATION SYSTEM FOR INTERNAL COMBUSTION ENGINE

(75) Inventor: Masakazu Tabata, Susono (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 329 days.

(21) Appl. No.: 12/376,489

(22) PCT Filed: Nov. 21, 2007

(86) PCT No.: PCT/IB2007/003576
§ 371 (c)(1), (2), (4) Date: Feb. 5, 2009

(87) PCT Pub. No.: WO2008/065497
PCT Pub. Date: Jun. 5, 2008

(65) Prior Publication Data
US 2010/0224174 A1    Sep. 9, 2010

(30) Foreign Application Priority Data
Nov. 29, 2006  (JP) ................................ 2006-321331

(51) Int. Cl.
*F02B 47/08* (2006.01)
*F02M 25/07* (2006.01)

(52) U.S. Cl. ............... 123/568.19; 123/568.21; 701/108

(58) Field of Classification Search ............. 123/568.19, 123/568.21; 60/605.2; 701/108
See application file for complete search history.

(56) References Cited

U.S. PATENT DOCUMENTS

| | | | | |
|---|---|---|---|---|
| 6,152,118 A | * | 11/2000 | Sasaki et al. | 123/568.21 |
| 6,233,936 B1 | * | 5/2001 | Hakansson | 60/605.2 |
| 2004/0093866 A1 | * | 5/2004 | Ishikawa | 60/605.2 |
| 2005/0103014 A1 | * | 5/2005 | Sasaki | 60/605.2 |
| 2006/0207252 A1 | * | 9/2006 | Isobe et al. | 60/601 |
| 2007/0068159 A1 | * | 3/2007 | Ueno et al. | 60/605.2 |
| 2007/0119172 A1 | * | 5/2007 | Barbe et al. | 60/605.2 |

FOREIGN PATENT DOCUMENTS

| | | |
|---|---|---|
| EP | 0982486 A2 | 3/2000 |
| EP | 1193388 A2 | 4/2002 |
| JP | 62-067926 U | 4/1987 |
| JP | 62-247135 A | 10/1987 |
| JP | 07-083086 A | 3/1995 |
| JP | 2000-145512 A | 5/2000 |
| JP | 2002-106398 A | 4/2002 |
| JP | 2003-286909 A | 10/2003 |
| JP | 2006-257940 A | 9/2006 |
| JP | 2007-162500 A | 6/2007 |
| WO | 00/28203 A1 | 5/2000 |
| WO | 2005/003536 A1 | 1/2005 |

* cited by examiner

*Primary Examiner* — Willis Wolfe, Jr.
*Assistant Examiner* — Anthony L Bacon
(74) *Attorney, Agent, or Firm* — Sughrue Mion, PLLC

(57) ABSTRACT

An exhaust gas recirculation system includes: a turbocharger (8) that includes a compressor (8a) and a turbine (8b); a throttle valve (7), provided in an intake passage (3) upstream of the compressor (8a); an EGR passage (11) through which a portion of exhaust gas from the exhaust passage (4) is recirculated to the intake passage (3) between the throttle valve (7) and the compressor (8a); and an EGR valve (13) that regulates a flow rate of exhaust flowing in the EGR passage (11). The exhaust gas recirculation system further includes valve control means that controls the opening degree of the throttle valve (7) and the opening degree of the EGR valve (13) so that the pressure in the intake passage (3) between the throttle valve (7) and the compressor (8a) is maintained at or above a predetermined pressure.

15 Claims, 10 Drawing Sheets

EXHAUST GAS RECIRCULATION SYSTEM FOR INTERNAL COMBUSTION ENGINE

BACKGROUND OF THE INVENTION

1. Field of Invention

The present invention relates to an exhaust gas recirculation system for an internal combustion engine that recirculates exhaust gas to the upstream side of a compressor of a turbocharger.

2. Description of Related Art

Japanese Patent Application Publication No. 2002-106398 (hereinafter, referred to as "JP-A-2002-106398") describes a conventional exhaust emission control system for an internal combustion engine equipped with a supercharger in which an inlet of recirculated exhaust gas is provided on the upstream side of the compressor of a turbocharger, and a throttle valve is arranged on the upstream side of this inlet. The exhaust emission control system includes a failsafe means for feeding air at a predetermined flow rate to the compressor to prevent the pressure upstream of the compressor from becoming excessively negative when a malfunction causes the throttle valve to become fully closed. In addition, a technique related to the present invention is described in Japanese Utility Model Application Publication No. 62-067926 (JP-U-62-067926).

In an internal combustion engine in which a portion of the exhaust gas is recirculated from an exhaust passage to an intake passage upstream of the compressor of a turbocharger and downstream of a throttle valve, the pressure in the intake passage between the throttle valve and the compressor (hereinafter, this pressure simply referred to as "the intake pressure upstream of the compressor") is varied to vary the flow rate of the exhaust gas to be recirculated. For example, to increase the flow rate of the recirculated exhaust gas, the intake pressure upstream of the compressor is reduced to increase the difference between the pressure in the exhaust passage and the pressure in the intake passage. Because the system described in JP-A-2002-106398 does not take the recirculated exhaust gas into consideration when controlling the intake pressure upstream of the compressor, the intake pressure upstream of the compressor may become excessively negative when increasing the flow rate of recirculated exhaust gas. In this case, for example, the intake pressure in the compressor housing may drop excessively, which may, in turn, cause oil to leak from the oil seal portion of the bearing of the compressor.

SUMMARY OF THE INVENTION

The present invention provides an exhaust gas recirculation system for an internal combustion engine that controls the pressure in an intake passage upstream of a compressor so that the pressure does not undergo an excessive drop.

An exhaust gas recirculation system according to a first aspect of the present invention includes: a turbocharger that includes a compressor and a turbine; a throttle valve, provided in an intake passage upstream of the compressor; an exhaust gas recirculation passage through which a portion of exhaust gas flowing in an exhaust passage is recirculated to a intake passage between the throttle valve and the compressor; an exhaust gas recirculation valve that regulates a flow rate of exhaust gas flowing in the exhaust passage; and valve control means for controlling an opening degree of the throttle valve and an opening degree of the exhaust gas recirculation valve so that pressure in the intake passage between the throttle valve and the compressor is maintained at or above a predetermined pressure.

The intake air amount that is regulated by the throttle valve, and the recirculated exhaust gas that is regulated by the exhaust gas recirculation valve flow into the intake passage between the throttle valve and the compressor. Therefore, by controlling the respective opening degrees of these valves, the intake pressure upstream of the compressor may be controlled in an appropriate manner. Accordingly, the opening degrees of these valves are controlled so that the intake pressure upstream of the compressor is maintained at or above a predetermined pressure, thereby suppressing an excessive drop in the intake pressure upstream of the compressor. For example, even when it is forced to reduce the intake pressure upstream of the compressor in order to increase the flow rate of recirculated exhaust gas, it is possible to suppress an excessive drop in the intake pressure upstream of the compressor by controlling the opening degrees of the respective valves so that these valves are not closed simultaneously.

The valve control means may control the opening degree of the throttle valve and the opening degree of the exhaust gas recirculation valve such that at least one of the throttle valve and the exhaust gas recirculation valve remains open.

The valve control means may close the throttle valve after the exhaust gas recirculation valve is opened. In this case, even when the throttle valve is closed and the intake air amount decreases, the exhaust gas recirculation valve is opened and the amount of recirculated exhaust gas increases, so that the intake pressure upstream of the compressor does not readily drop. Therefore, it is possible to suppress an excessive drop in the intake pressure upstream of the compressor.

The exhaust gas recirculation system may further include start-delay time setting means for setting a start-delay time of the exhaust gas recirculation based on an intake air amount of the internal combustion engine. Also, when the exhaust gas is recirculated, the valve control means may open the exhaust gas recirculation valve, and then close the throttle valve after the start-delay time of the exhaust gas recirculation has elapsed. In this case, because the exhaust gas recirculation valve is opened to increase the amount of exhaust gas recirculated before the throttle valve is closed, the opening degrees of the respective valves may be varied while suppressing a variation in the amount of gas flowing into the intake passage upstream of the compressor. Further, the start-delay time of the exhaust gas recirculation is provided between when the exhaust gas recirculation valve is opened and when the throttle valve is closed. Accordingly, by setting the length of the start-delay time of the exhaust gas recirculation as appropriate, the throttle valve is closed after the amount of recirculated exhaust gas that may maintain the intake pressure upstream of the compressor at or above a predetermined pressure has been inducted. Thus, it is possible to suppress an excessive drop in the intake pressure upstream of the compressor. If the intake air amount of the internal combustion engine is large, a larger flow rate of recirculated exhaust gas is needed to maintain the intake pressure upstream of the compressor at or above a predetermined pressure. For example, if the start-delay time of the exhaust gas recirculation is short, the closing control of the throttle valve may be started before the exhaust gas recirculation sufficiently is opened, so that the intake air amount reduced due to the closing of the throttle valve may not be supplemented by the recirculated exhaust gas. Accordingly, the start-delay time setting means may set the start-delay time of the exhaust gas recirculation longer as the intake air amount of the internal combustion engine increases.

Further, the exhaust gas recirculation system according to the present invention may further include first minimum opening degree setting means for setting a minimum opening degree of the exhaust gas recirculation valve based on an intake air amount of the internal combustion engine. When the exhaust gas is recirculated, the valve control means may open the exhaust gas recirculation valve, and then close the throttle valve after the exhaust gas recirculation valve has been opened to at least the minimum opening degree. In this case, the throttle valve is closed after the exhaust gas recirculation valve has been opened to at least the minimum opening degree. Therefore, by setting this minimum opening degree as appropriate, the throttle valve may be closed after an amount of recirculated exhaust gas that may maintain the intake pressure upstream of the compressor at or above a predetermined pressure has been inducted. Further, in this case, because the throttle valve is closed after it is confirmed that the exhaust gas recirculation valve has been opened to at least the minimum opening degree, it is possible to suppress an excessive drop in the intake pressure upstream of the compressor more reliably. As described above, if the intake air amount of the internal combustion engine is large, a larger flow rate of recirculated exhaust gas is needed to maintain the intake pressure upstream of the compressor at or above the predetermined pressure. Accordingly, the first minimum opening amount setting means may set the minimum opening degree of the exhaust gas recirculation valve larger as the intake air amount of the internal combustion engine increases.

The valve control means may close the exhaust gas recirculation valve after the throttle valve is opened. In this case, the flow rate of recirculated exhaust gas reduced due to the closing of the exhaust gas recirculation valve may be supplemented by an increase in intake air amount, thus making it possible to suppress an excessive drop in the intake pressure upstream of the compressor.

The exhaust gas recirculation system according to the present invention may further include stop-delay time setting means for setting stop-delay time of the exhaust gas recirculation based on the intake air amount of the internal combustion engine. When the exhaust gas recirculation is stopped, the valve control means may open the throttle valve, and then close the exhaust gas recirculation valve after the stop-delay time of the exhaust gas recirculation has elapsed. By controlling the opening degrees of the respective valves in this order, it is possible to suppress a drop in the intake pressure upstream of the compressor. Further, because the stop-delay time of the exhaust gas recirculation is provided between when the throttle valve is opened and the exhaust gas recirculation valve is closed, the throttle valve may be closed after the intake air amount has been regulated up to an amount that may maintain the intake pressure upstream of the compressor at or above the predetermined pressure, by setting the length of the stop-delay time of the exhaust gas recirculation as appropriate. In this regard, as the intake air amount of the internal combustion engine increases, the flow rate of exhaust gas recirculated into the intake passage also increases. Therefore, if the amount of intake air to the internal combustion engine is large when the exhaust gas recirculation valve is opened, a larger amount of intake air is needed to maintain the intake pressure upstream of the compressor at or above the predetermined pressure when the recirculation exhaust valve is fully closed. Accordingly, the stop-delay time setting means may set the stop-delay time of the exhaust gas recirculation longer as the intake air amount of the internal combustion engine increases.

The exhaust gas recirculation system according to the present invention may further include second minimum opening setting means for setting a minimum opening degree of the throttle valve based on the intake air amount of the internal combustion engine. When the exhaust gas recirculation is stopped, the valve control means may open the throttle valve, and then close the exhaust gas recirculation valve after the throttle valve has been opened to at least the minimum opening amount. In this case, because the exhaust gas recirculation valve is closed after the throttle valve has been opened to at least the minimum opening amount, by setting this minimum opening degree of the throttle valve as appropriate, the exhaust gas recirculation valve may be closed after an amount of air that may maintain the intake pressure upstream of the compressor at or above the predetermined pressure has been inducted. Further, because the exhaust gas recirculation valve is closed after it is confirmed that the throttle valve has been opened to at least the minimum opening amount, it is possible to suppress an excessive drop in the intake pressure upstream of the compressor more reliably. As described above, if the intake air amount of the internal combustion engine is large when the exhaust gas recirculation valve is opened, the larger intake air amount is needed to maintain the intake pressure upstream of the compressor at or above the predetermined pressure when the exhaust gas recirculation valve is fully closed. Accordingly, the second minimum opening setting means may set the minimum opening degree of the throttle valve larger as the intake air amount of the internal combustion engine increases.

The exhaust gas recirculation passage may be provided between the exhaust passage downstream of the turbine and the intake passage upstream of the compressor.

The exhaust gas recirculation passage may be provided between the exhaust passage upstream of the turbine and the intake passage upstream of the compressor.

The exhaust gas recirculation passage may include the first exhaust gas recirculation passage that is provided between the exhaust passage downstream of the turbine and the intake passage upstream of the compressor, and the second exhaust gas recirculation passage that is provided between the exhaust passage upstream of the turbine and the intake passage downstream of the compressor.

Further, the predetermined pressure may be a pressure that prevents oil leaks from an oil seal portion provided within a housing of the compressor. In this case, because oil leaks from the oil seal portion may be prevented, it is possible to prevent excessive oil consumption. Further, because it is possible to prevent oil from adhering onto the interior of the compressor, it is possible to prevent the flow channel from becoming narrow due to the oil adhering onto the interior of the compressor, thereby suppressing a decrease in compressor efficiency.

The predetermined pressure may be a pressure that prevents over-speed of a rotary shaft that connects the compressor to the turbine.

The predetermined pressure may be an intake pressure upstream of the compressor that suppresses fluctuation in torque of the internal combustion engine when the exhaust gas recirculation is executed or stopped.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE PREFERRED EMBODIMENTS

Figure 1:
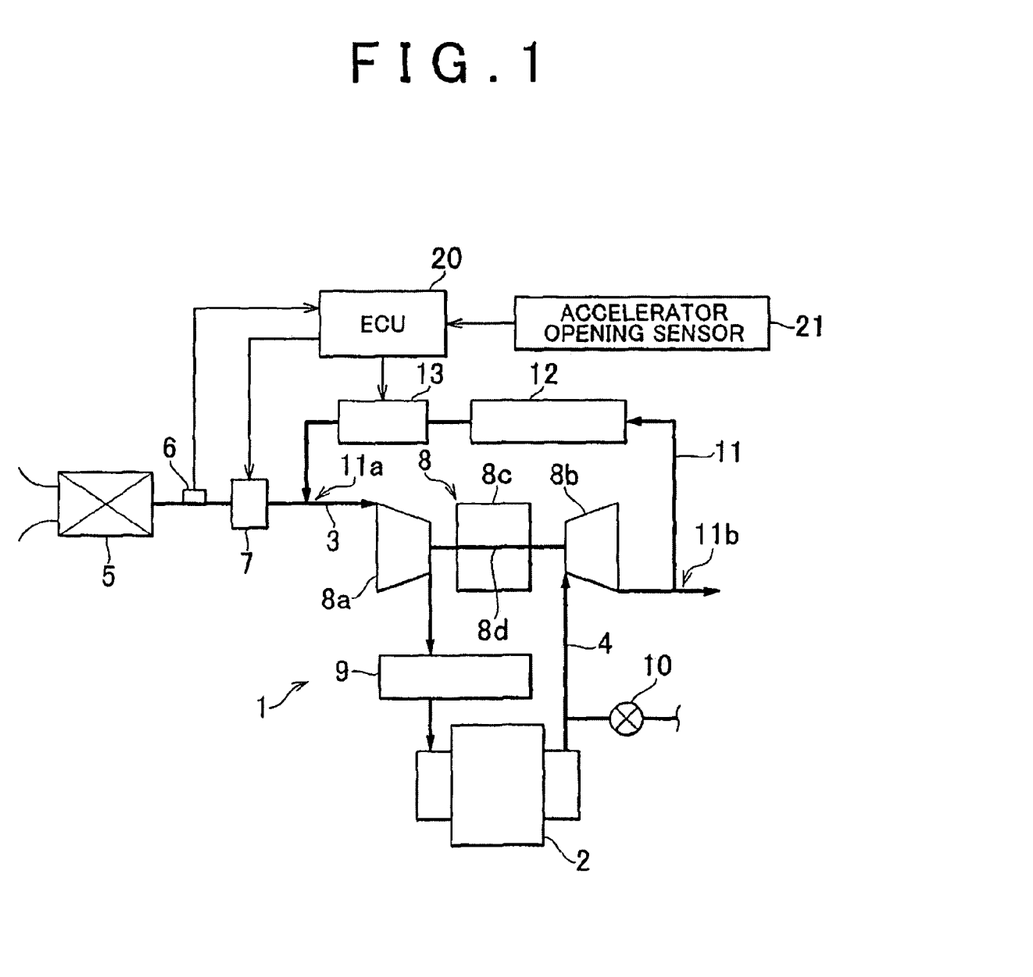
FIG. 1 is a schematic diagram showing an internal combustion engine equipped with an exhaust gas recirculation system according to an embodiment of the present invention.

FIG. 1 shows an example of an internal combustion engine that incorporates an exhaust gas recirculation system according to the present invention. An internal combustion engine 1 (hereinafter, also referred to as "engine 1") shown in FIG. 1 is mounted as a drive power source in a vehicle, and includes an engine body 2 provided with a plurality of cylinders (not shown), an intake passage 3 and an exhaust passage 4 that are connected to respective cylinders. The intake passage 3 is provided with an air filter 5 that filters intake air, an airflow meter 6 that outputs a signal indicating the intake air amount, a throttle valve 7 that regulates the intake air amount, a compressor 8a of a turbocharger 8, and an intercooler 9 that cools intake air. In the turbocharger 8, the turbine wheel of a turbine 8b and the compressor wheel of the compressor 8a are connected to each other by a rotary shaft 8d. The rotary shaft 8d is supported on a bearing provided in a center housing 8c of the turbocharger 8. Oil is supplied to the bearing from an oil pump (not shown). The compressor 8a has an oil seal portion to prevent oil supplied to the bearing from leaking into the compressor housing, which constitutes a portion of the intake passage 3.

The intake passage 3 and the exhaust passage 4 are connected to each other by an EGR passage 11 through which a portion of exhaust gas is recirculated into the intake passage 3. As shown in FIG. 1, one end 11a of the EGR passage 11 is connected to the intake passage 3 between the throttle valve 7 and the compressor 8a. The other end 11b of the EGR passage 11 is connected to the exhaust passage 4 located downstream of the turbine 8b. Therefore, in the engine 1 shown in FIG. 1, a portion of the exhaust gas discharged from the turbine 8b is recirculated into the intake passage 3 between the throttle valve 7 and the compressor 8a. The EGR passage 11 is provided with an EGR cooler 12 to cool the recirculated exhaust gas, and an EGR valve 13 to regulate the flow rate of the recirculated exhaust gas inducted to the intake passage 3.

The respective operations of the throttle valve 7 and EGR valve 13 are controlled by an electronic control unit 20 (hereinafter, referred to as "ECU 20"). The ECU 20 is configured as a computer including a microprocessor and peripheral devices necessary for its operation such as a RAM and ROM. It should be noted that the ECU 20 is a computer unit that also controls the operating state of the engine 1 by controlling the operations of, for example, the throttle valve 7 and the EGR valve 13 based on output signals of various sensors such as the airflow meter 6. Also, an accelerator opening sensor 21 that outputs a signal corresponding to the accelerator opening degree, or the like is connected to the ECU 20.

In the engine 1 shown in FIG. 1, a portion of the exhaust gas from the exhaust passage 4 is recirculated into the intake passage 3 when the operating state of the engine 1 falls within an EGR operation region. The recirculation of exhaust gas is executed by opening the EGR valve 13 and generating a pressure difference between the one end 11a and the other end 11b of the EGR passage 11. The pressure difference is generated when the opening degree of the throttle valve 7 is decreased to reduce the intake air amount, thereby lowering the pressure in the intake passage 3 between the throttle valve 7 and the compressor 8a (hereinafter, this pressure may be also referred to as "the intake pressure upstream of the compressor 8a"). At this time, if both the throttle valve 7 and the EGR valve 13 are closed, the intake pressure upstream of the compressor 8a drops excessively, which may cause various problems. Accordingly, in the embodiment of the present invention, the throttle valve 7 and the EGR valve 13 are controlled such that the EGR valve 13 remains open when the throttle valve 7 is closed, and the throttle valve 7 remains open when the EGR valve 13 is closed. By controlling the operations of the throttle valve 7 and the EGR valve 13 in this manner, air or recirculated exhaust gas may be supplied to the intake passage 3 between the throttle valve 7 and the compressor 8a, thereby making it possible to suppress an excessive drop in the intake pressure upstream of the compressor.

Hereinafter, a method of controlling the throttle valve 7 and the EGR valve 13 will be described with reference to FIGS. 2A, 2B, 3A and 3B. An EGR start control routine shown in FIGS. 2A and 2B, and an EGR stop control routine shown in FIGS. 3A and 3B are control routines executed by the ECU 20 to control recirculation of exhaust into the intake passage 3 by controlling the respective operations of the throttle valve 7 and EGR valve 13. The ECU 20 executing these control routines may be regarded as "valve control means" in accordance with the present invention.

Figure 2A:
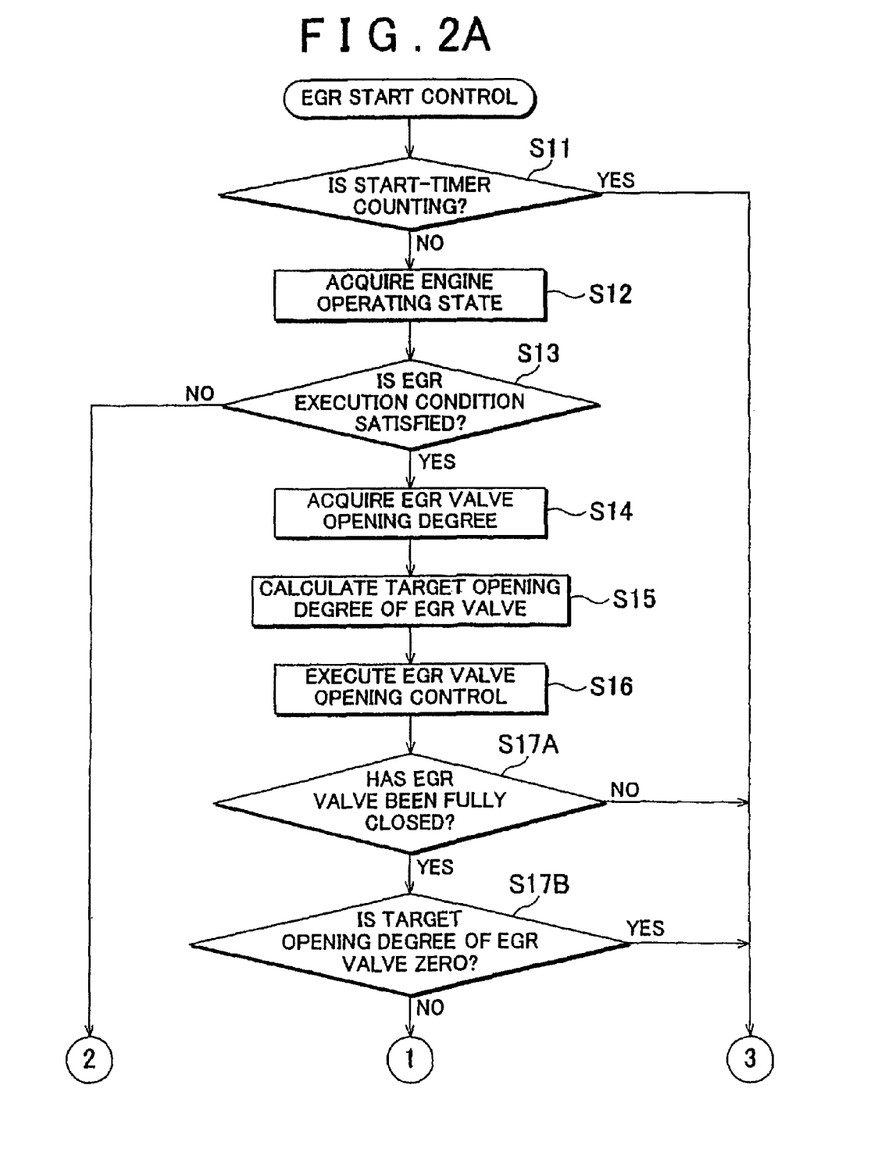
FIGS. 2A and 2B are flow charts showing an EGR start control routine executed by an ECU.
Figure 2B:
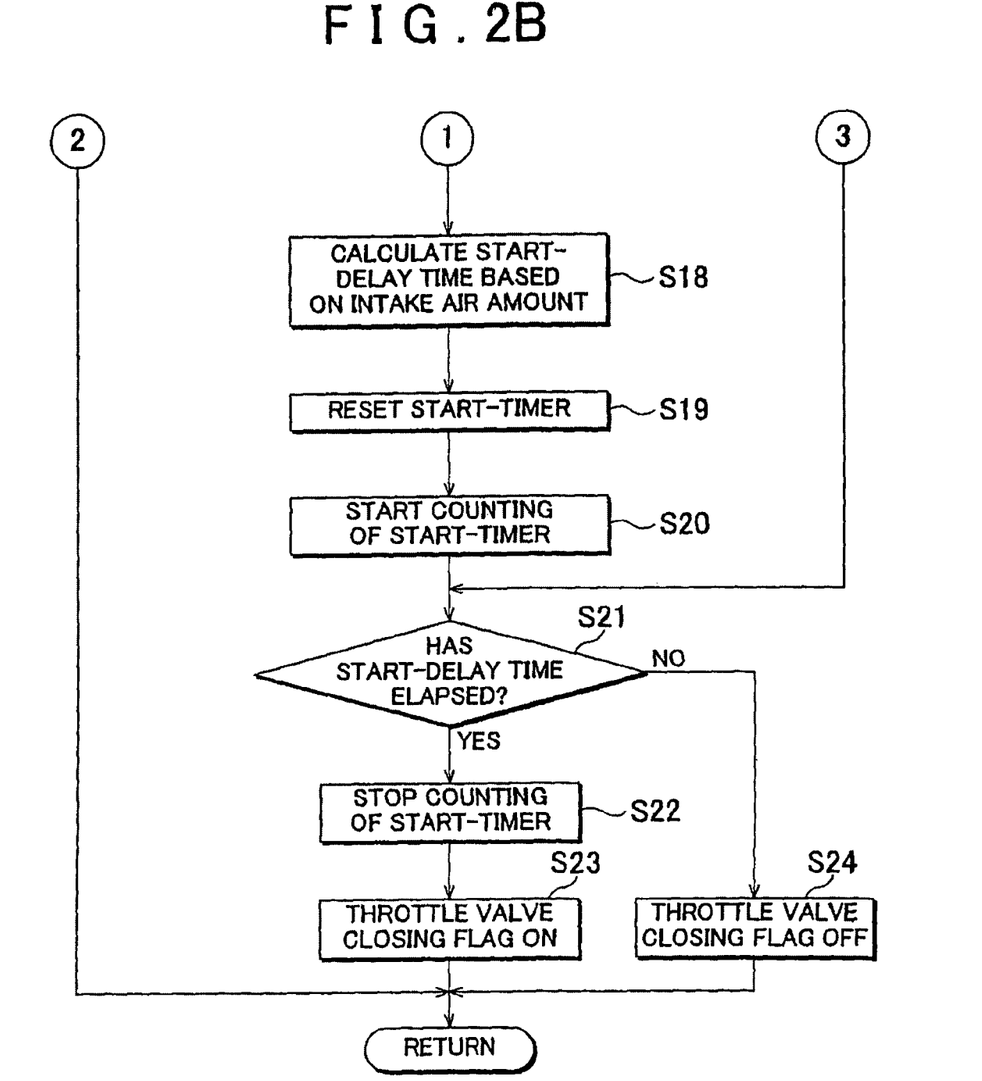
Figure 3A:
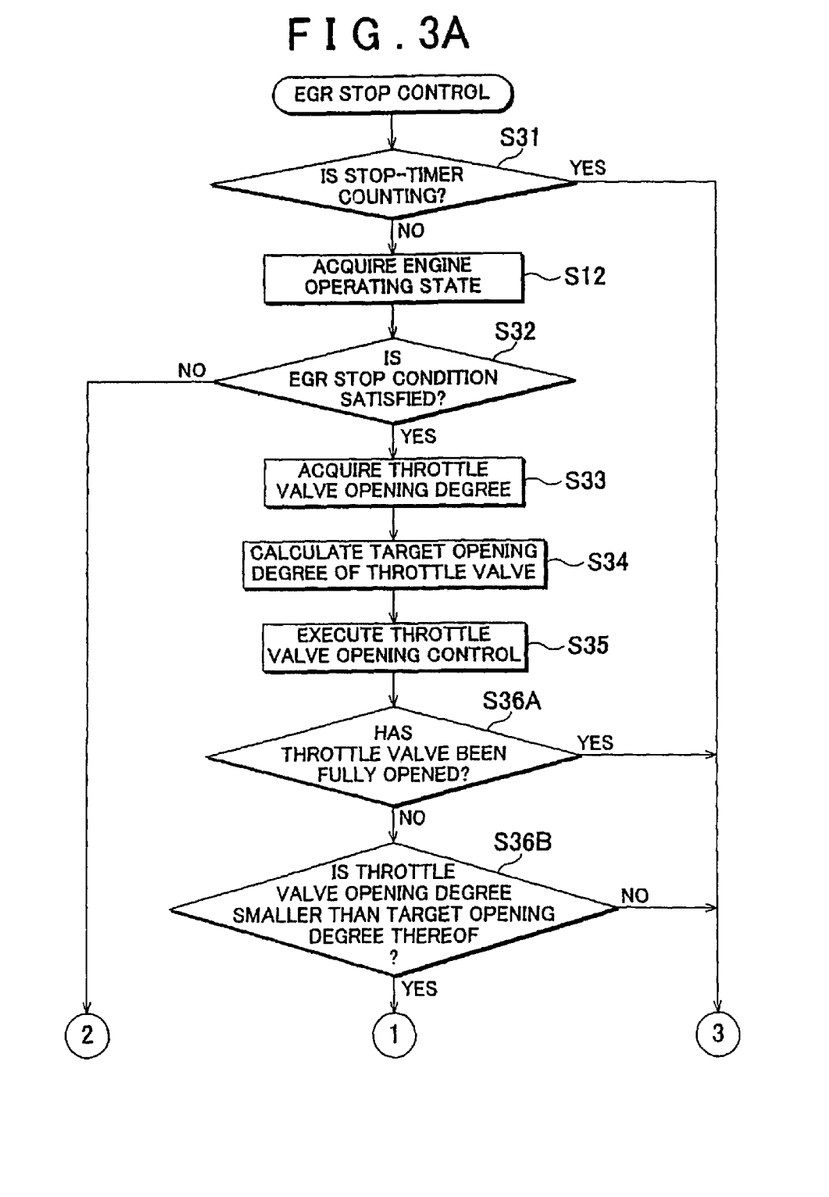
FIGS. 3A and 3B are flow charts showing an EGR stop control routine executed by an ECU.
Figure 3B:
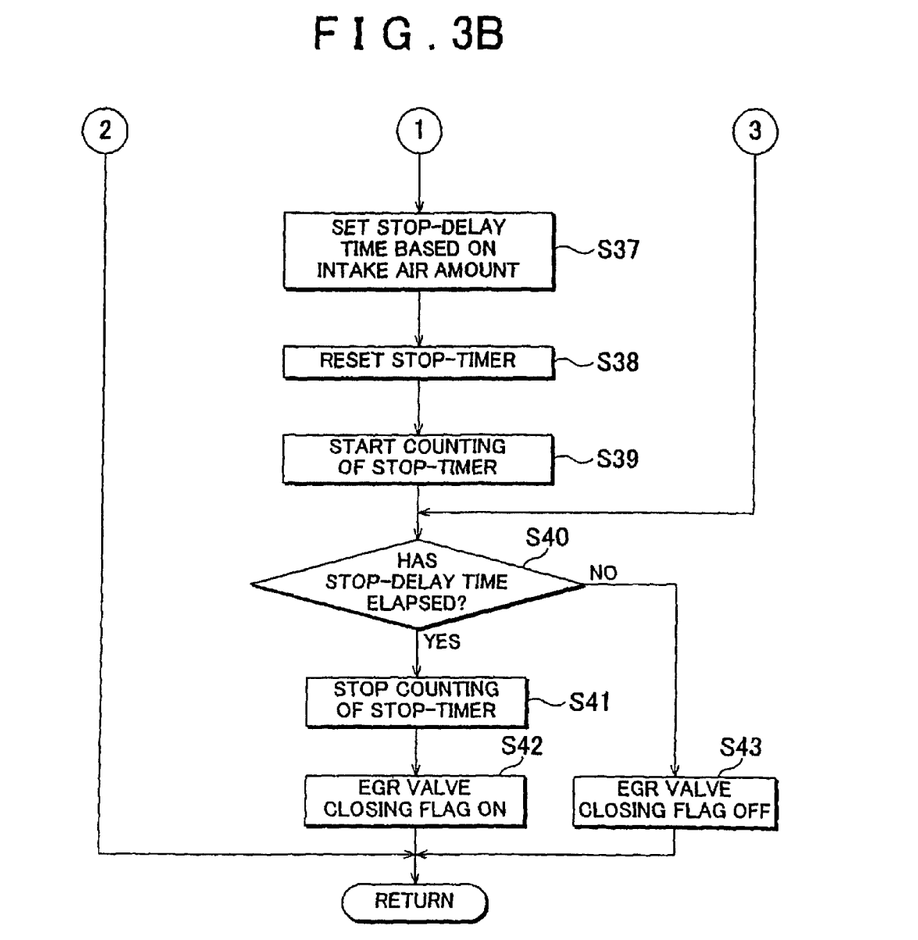

The EGR start control routine shown in FIGS. 2A and 2B is periodically executed at predetermined intervals during the operation of the engine 1. In the EGR start control routine shown in FIGS. 2A and 2B, the ECU 20, in step S11, determines whether a start-timer is counting. By counting the start-timer, a start-delay time T1 of the exhaust gas recirculation, provided between when the EGR valve 13 is opened and when the throttle valve 7 is closed, is measured. If it is determined that the start-timer is counting, the operation skips steps S12 to S20 and proceeds to step S21. On the other hand, if it is determined that the start-timer is not counting, the operation proceeds to step S12, and the ECU 20 acquires the operating state of the engine 1 such as the intake air amount. Thereafter, in step S13, the ECU 20 determines whether an EGR execution condition for recirculating a portion of exhaust gas into the intake passage 3 is satisfied. The EGR execution condition is determined to be satisfied if the operating state of the engine 1 falls within the EGR operation region as described above. However, the method of determining whether the EGR execution condition is satisfied is not limited to this. The determination may be performed in the same manner as in conventional EGR valve control methods. If it is determined that the EGR execution condition is not satisfied, the present control operation ends.

On the other hand, if it is determined that the EGR execution condition is satisfied, the operation proceeds to step S14, and the ECU 20 acquires the opening degree of the EGR valve 13. Thereafter, in step S15, the ECU 20 calculates the target opening degree of the EGR valve 13. This calculation may be performed in the same manner as in conventional EGR valve control methods. For example, the relationship between the operating state of the engine 1 and the flow rate of the exhaust gas to be recirculated in the operating state of the engine 1 may be stored as a map into the ROM of the ECU 20. Then, the flow rate of the exhaust gas to be recirculated may be identified with reference to the map stored in the ROM. Next, the target opening degree of the EGR valve 13, which is required for recirculating the identified exhaust gas into the intake passage 3, is calculated. Thereafter, in step S16, the ECU 20 changes the opening degree of the EGR valve 13 in accordance with the calculated target opening degree of the EGR valve 13.

Next, in step S17A, the ECU 20 determines whether the EGR valve 13 before changing the opening degree of the EGR valve 13 has been fully closed. If yes in step S17A, the ECU 20 determines whether the target opening degree of the EGR valve 13 calculated in step S15 is zero (in step S17B). That is, the ECU 20 determines whether the fully closed EGR valve 13 needs to be opened by the opening control of the EGR valve 13. If it is determined that the EGR valve 13 has been open in step S17A or the target opening degree of the EGR valve 13 is zero in step S17B, the operation skips steps S18 to S20 and proceeds to step S21. On the other hand, if it is determined that the EGR valve 13 has been fully closed and the target opening degree of the EGR valve 13 is not zero, the operation proceeds to step S18, and the ECU 20 calculates the start-delay time T1 of the exhaust gas recirculation based on the intake air amount of the engine 1. The ECU 20, in executing the step S18, may be regarded as the "first start-delay time setting means" in accordance with the present invention. As described above, when exhaust gas is recirculated, the opening degree of the throttle valve 7 is reduced to decrease the intake air amount. At this time, if the throttle valve 7 is closed immediately after the EGR valve 13 is opened, the intake pressure upstream of the compressor may drop excessively. Accordingly, the start-delay time T1 of the exhaust gas recirculation is provided between when the EGR valve 13 is opened and when the throttle valve 7 is closed. The start-delay time T1 of the exhaust gas recirculation may be set so that, for example, the intake pressure upstream of the compressor is maintained at or above a predetermined pressure. The predetermined pressure may be set to a pressure that does not undergo an excessive drop in the housing of the compressor 8a, thereby preventing oil leaks through the oil seal portion into the housing. An excessive drop in the pressure upstream of the compressor restrains the gas from flowing into the compressor 8a, which may result in over-speed of the rotary shaft 8d. Accordingly, the predetermined pressure may also be set to a pressure that may prevent over-speed of the rotary shaft 8d.

Figure 4:
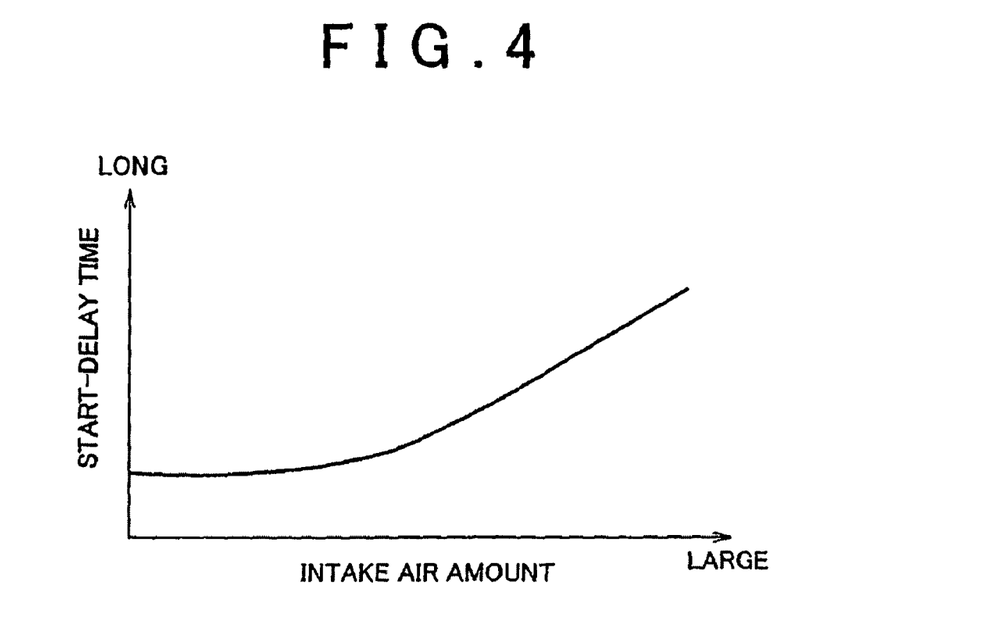
FIG. 4 is a diagram showing the relationship between the intake air amount and the start-delay time of the exhaust gas recirculation.

To maintain the intake pressure upstream of the compressor at or above a predetermined pressure, it is necessary to set the start-delay time T1 of the exhaust gas recirculation in accordance with the intake air amount obtained before the throttle valve 7 is controlled closed. For example, if the start-delay time T1 of the exhaust gas recirculation is short, the throttle valve 7 may be closed before the EGR valve 13 is sufficiently opened. In this case, if the intake air amount is small, the intake air amount reduced by the closing of the throttle valve 7 may be supplemented by recirculated exhaust gas inducted when the EGR valve 13 is opened. On the other hand, if the intake air amount increases, the intake air amount reduced due to the closing of the throttle valve 7 may not be supplemented by recirculated exhaust gas, so the intake pressure upstream of the compressor may drop below the predetermined pressure. Accordingly, the start-delay time T1 of the exhaust gas recirculation is set long as the intake air amount inducted before the throttle valve 7 is controlled closed increases. The start-delay time T1 of the exhaust gas recirculation is set with reference to a map in the ROM of the ECU 20 where the relationship shown in FIG. 4 is stored, for example.

Next, in step S19, the ECU 20 resets the value of the start-timer to zero, and then starts the counting of the start-timer in step S20. Thereafter, in step S21, the ECU 20 determines whether the start-delay time T1 of the exhaust gas recirculation has elapsed since the start of counting by the start-timer. If it is determined that the start-delay time T1 of the exhaust gas recirculation has elapsed, the operation proceeds to step S22. In step S22, the ECU 20 stops counting the start-timer. Thereafter, in step S23, the ECU 20 switches a throttle valve closing flag to ON state, which indicates that the throttle valve 7 may be closed. Closing of the throttle valve 7 is thus started. Thereafter, the present control routine ends. On the other hand, if it is determined that the start-delay time T1 of the exhaust gas recirculation has not elapsed, the operation proceeds to step S24, and the ECU 20 keeps the throttle valve closing flag OFF state. Closing of the throttle valve 7 is thus prohibited. Thereafter, the present control routine ends.

In the control routine shown in FIGS. 2A and 2B, because the throttle valve 7 is controlled closed after the EGR valve 13 is controlled open, it is possible to suppress a fluctuation in the flow rate of gas flowing into the compressor 8a. It is thus possible to suppress the intake pressure upstream of the compressor from dropping excessively. Further, because the start-delay time T1 of the exhaust gas recirculation is provided between when the EGR valve 13 is opened and when the throttle valve 7 is closed, the intake pressure upstream of the compressor may be maintained at or above the predetermined pressure. Therefore, the oil leaks from the oil seal portion in the compressor 8a, for example, may be prevented.

Next, the EGR stop control routine shown in FIGS. 3A and 3B will be described. This control routine is also executed periodically at predetermined intervals during operation of the engine 1. It should be noted that in FIGS. 3A and 3B, the operations that are similar to those of FIGS. 2A and 2B are denoted by the same reference numerals, and description thereof may not be repeated. In the EGR stop control routine shown in FIGS. 3A and 3B, the ECU 20 determines whether the stop-timer is counting (in step S31). By counting the stop-timer, a stop-delay time T2 of the exhaust gas recirculation, provided between when the throttle valve 7 is opened and when the EGR valve 13 is closed, is measured. If it is determined that the stop-timer is counting, the operation skips steps S12 and S32 to S39 and proceeds to step S40. On the other hand, if it is determined that the stop-timer is not counting, the operation proceeds to step S12, and the ECU 20 acquires the operating state of the engine 1. Next, in step S32, the ECU 20 determines whether a condition for stopping the exhaust gas recirculation (hereinafter, referred to as the "EGR stop condition") is satisfied. If the operating state of the engine 1 falls outside the EGR operation region, for example, it is determined that the EGR stop condition is satisfied. However, the determination of the EGR stop condition is not limited to this. The determination may be performed in the same manner as in convention EGR valve control methods. If it is determined that the EGR stop condition is not satisfied, the present control routine ends.

On the other hand, if it is determined that the EGR stop condition is satisfied, the operation proceeds to step S33, and the ECU 20 acquires the opening degree of the throttle valve 7. Thereafter, in step S34, the ECU 20 calculates the target opening degree of the throttle valve 7. This calculation may be performed in the same manner as in conventional throttle valve control methods used to stop recirculation of the exhaust gas. For example, an opening degree at which the operating state of the engine 1 is stably maintained when the EGR valve 13 has been fully closed may be calculated as the target opening degree of the throttle valve 7. Thereafter, in step S35, the ECU 20 changes the opening degree of the throttle valve 7 in accordance with the calculated target opening of the throttle valve 7.

Next, in step S36A, the ECU 20 determines whether the throttle valve 7 before changing the opening degree of the throttle valve 7 has been fully opened. Then, if no in step S36A, the ECU 20, in step S36B, determines whether the present opening degree of the throttle valve 7 is smaller than the target opening degree of the throttle valve 7 calculated in step S34. That is, the ECU 20 determines whether the throttle valve 7 needs to be opened. If the throttle valve 7 has been fully opened in step S36A, or the target opening degree of the throttle valve 7 is equal to or smaller than the present opening degree of the throttle valve 7 in step S36B, the operation skips steps S37 to S39 and proceeds to step S40. On the other hand, if it is determined that the throttle valve 7 has not been fully opened, and that the target opening degree of the throttle valve 7 is larger than the present opening degree of the throttle valve 7, the operation proceeds to step S37. In step S37, the ECU 20 sets the stop-delay time T2 of the exhaust gas recirculation based on the intake air amount of the engine 1. The ECU 20, in executing step S37, may be regarded as the "second stop-delay time setting means" in accordance with the present invention. When the recirculation of exhaust gas into the intake passage is stopped, the EGR valve 13 is fully closed, and the throttle valve 7 is opened. At this time, if the EGR valve 13 is fully closed immediately after the throttle valve 7 is opened, the intake pressure upstream of the compressor may drop excessively. Accordingly, the stop-delay time T2 of the exhaust gas recirculation is provided between when the throttle valve 7 is opened and when the EGR valve 13 is closed. The stop-delay time T2 of the exhaust gas recirculation is set such that the intake pressure upstream of the compressor is maintained at or above the predetermined pressure.

Figure 5:
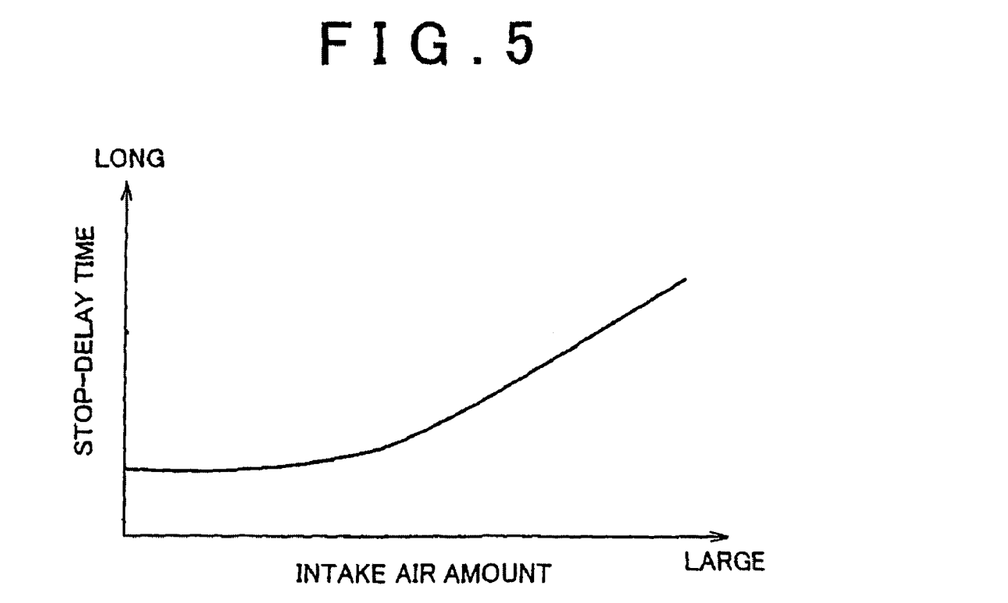
FIG. 5 is a diagram showing the relationship between the intake air amount and the stop-delay time of the exhaust gas recirculation.

As such, it is necessary to set the stop-delay time T2 of the exhaust gas recirculation in accordance with the intake air amount obtained before the EGR valve 13 is controlled closed. The flow rate of recirculated exhaust gas is affected by the intake air amount of the engine 1. Thus, as the amount of intake air increases, a larger flow rate of recirculated exhaust gas is set. Therefore, the stop-delay time T2 of the exhaust gas recirculation is set long as the intake air amount inducted before the EGR valve 13 is controlled closed increases, so the throttle valve 7 may be sufficiently opened. The stop-delay time T2 of the exhaust gas recirculation is set with reference to a map in the ROM of the ECU 20 where the relationship shown in FIG. 5 is stored, for example.

Next, in step S38, the ECU 20 resets the value of the stop-timer to zero, and then starts the counting of the stop-timer in step S39. Thereafter, in step S40, the ECU 20 determines whether the stop-delay time T2 of the exhaust gas recirculation has elapsed since the start of counting of the stop-timer. If it is determined that the stop-delay time T2 of the exhaust gas recirculation has elapsed, the operation proceeds to step S41, and the ECU 20 stops counting the stop-timer. Thereafter, in step S42, the ECU 20 switches an EGR valve closing flag to ON state, which indicates that the EGR valve 13 may be controlled closed. Closing of the EGR valve 13 is thus started. Thereafter, the present control routine ends. On the other hand, if it is determined that the stop-delay time T2 of the exhaust gas recirculation has not elapsed, the operation proceeds to step S43, and the ECU 20 keeps the EGR valve closing flag OFF state. Closing of the EGR valve 13 is thus prohibited. Thereafter, the present control routine ends.

When the recirculation of exhaust gas is stopped in this manner, the EGR valve 13 is controlled closed after the throttle valve 7 is controlled opened. Therefore, it is possible to suppress the intake pressure upstream of the compressor from dropping excessively. Further, because the stop-delay time T2 of the exhaust gas recirculation is provided between when the throttle valve 7 is opened and when the EGR valve 13 is closed, the intake pressure upstream of the compressor may be maintained at or above the predetermined pressure.

Figure 6:
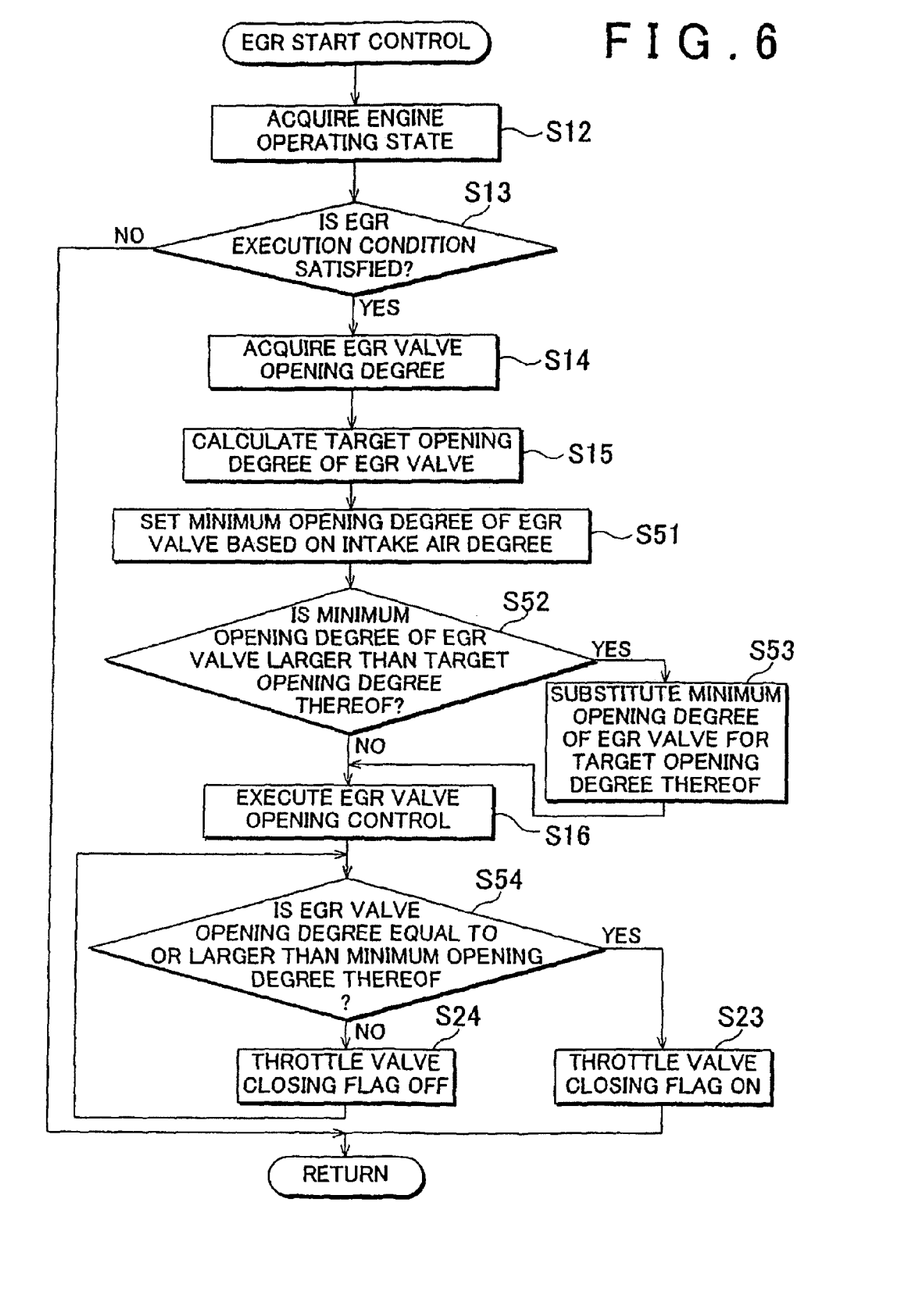
FIG. 6 is a flow chart showing a modification of the EGR start control routine shown in FIGS. 2A and 2B.
Figure 7:
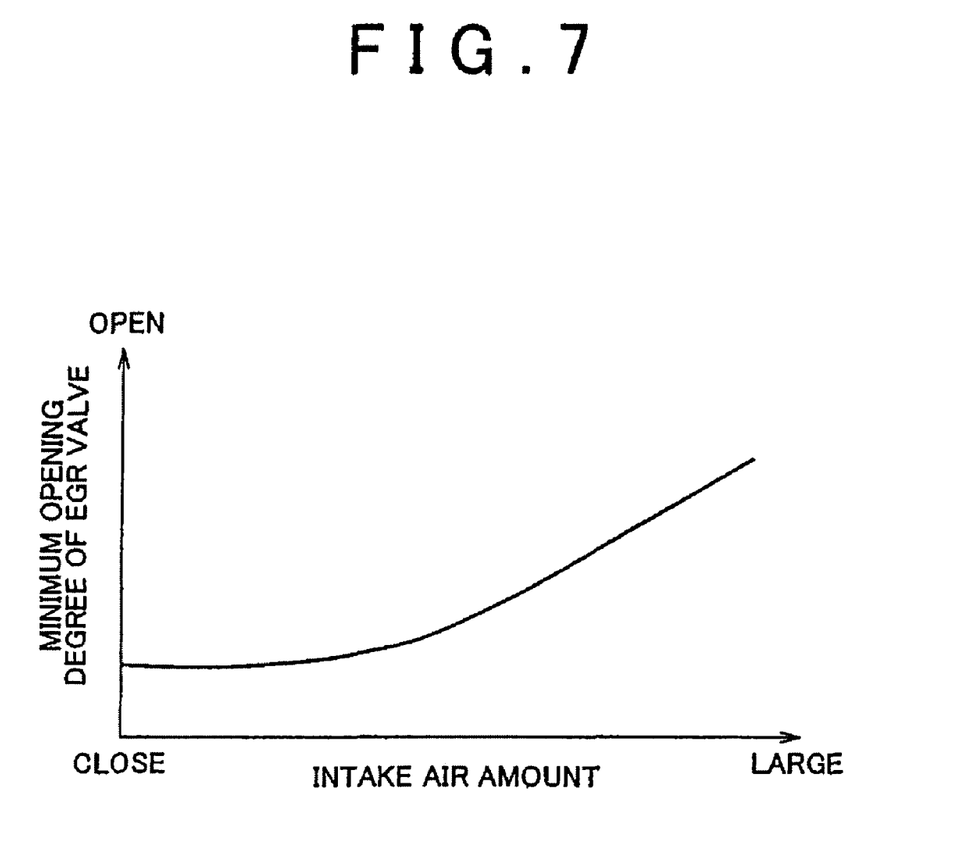
FIG. 7 is a diagram showing the relationship between the intake air amount and the minimum EGR-valve opening.
Figure 8:
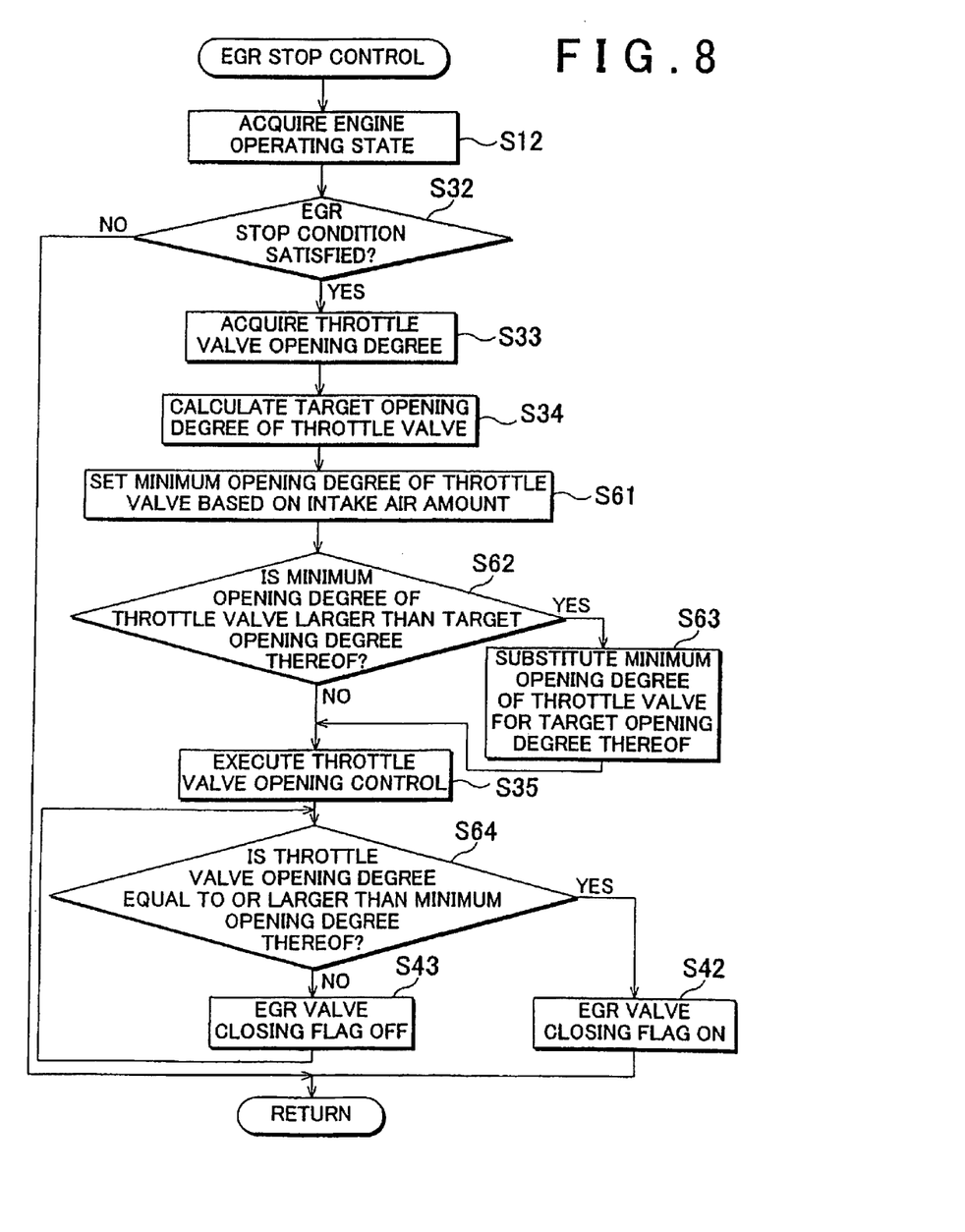
FIG. 8 is a flow chart showing a modification of the EGR stop control routine shown in FIGS. 3A and 3B.

Next, referring to FIGS. 6 to 9, modifications of the EGR start control routine and EGR stop control routine will be described. FIG. 6 shows a modification of the EGR start control routine, and FIG. 8 shows a modification of the EGR stop control routine. First, the EGR start control routine shown in FIG. 6 will be described. The EGR start control routine shown in FIG. 6 is periodically executed at predetermined intervals during operation of the engine 1 in parallel with other control routines executed by the ECU 20. It should be noted that in FIG. 6, the operations that are similar to those of FIGS. 2A and 2B are denoted by the same reference numerals, and description thereof may not be repeated.

In the control routine shown in FIG. 6, in step S12, the ECU 20 acquires the operating state of the engine 1. Thereafter, in step S13, the ECU 20 determines whether the EGR execution condition is satisfied. If it is determined that the EGR execution condition is not satisfied, the present control routine ends. On the other hand, if it is determined that the EGR execution condition is satisfied, the opening degree of the EGR valve 13 is acquired in step S14, and then, the target opening degree of the EGR valve 13 is calculated in step S15.

Next, in step S51, the ECU 20 sets a minimum opening degree of the EGR valve 13 based on the intake air amount of the engine 1. The minimum opening degree of the EGR valve 13 is an opening degree at which the EGR valve 13 should be opened before the throttle valve 7 is controlled closed such that the intake pressure upstream of the compressor is maintained at or above the predetermined pressure. When the intake air amount inducted before the throttle valve 7 is controlled closed increases, the in the intake air amount reduced due to the closing of the throttle valve 7 may not be supplemented by recirculated exhaust gas unless the EGR valve 13 remains open at or above the predetermined opening degree. Accordingly, as the intake air amount inducted before the throttle valve 7 is controlled closed increases, a larger minimum opening degree of the EGR valve 13 is set. The minimum opening degree of the EGR valve 13 is set with reference to a map in the ROM of the ECU 20 where the relationship shown in FIG. 7 is stored, for example. The ECU 20, in executing step S51, may be regarded as the "first minimum opening degree setting means" in accordance with the present invention.

Then, in step S52, the ECU 20 determines whether the minimum opening degree of the EGR valve 13 is larger than the target opening degree of the EGR valve 13. If it is determined that the target opening degree of the EGR valve 13 is equal to or larger than the minimum opening degree of the EGR valve 13, the operation proceeds to step S16, and the ECU 20 controls the opening degree of the EGR valve 13. On the other hand, if it is determined that minimum opening degree of the EGR valve 13 is larger than the target opening degree of the EGR valve 13, the operation proceeds to step S53, and the ECU 20 substitutes the minimum opening degree of the EGR valve 13 for the target opening degree of the EGR valve 13. The EGR valve 13 may be thus opened to the minimum opening degree thereof. Thereafter, the operation proceeds to step S16, and the ECU 20 controls the opening degree of the EGR valve 13.

After the opening degree of the EGR valve 13 is controlled in step S16, the operation proceeds to step S54, and the ECU 20 determines whether the opening degree of the EGR valve 13 is equal to or larger than the minimum opening degree thereof. If it is determined that the opening degree of the EGR valve 13 is less than the minimum opening degree thereof, the operation proceeds to step S24, and the ECU 20 keeps the throttle valve closing flag to OFF state. Thereafter, the operation returns to step S54, and the operations of steps S54 and S24 are repeated until the opening degree of the EGR valve 13 is equal to or larger than the minimum opening thereof. Thus, the throttle valve 7 remains open until the opening degree of the EGR valve 13 is equal to or larger than the minimum opening degree thereof. On the other hand, if it is determined that the opening degree of the EGR valve 13 is equal to or larger than the minimum opening degree thereof, the operation proceeds to step S23, and the ECU 20 switches the throttle valve closing flag to ON state. Thereafter, the present control routine ends.

In the EGR start control routine shown in FIG. 6, because the throttle valve 7 remains open until the opening degree of the EGR valve 13 is equal to or larger than the minimum opening degree thereof, an excessive drop in the intake pressure upstream of the compressor is suppressed, thereby making it possible to more reliably maintain the intake pressure upstream of the compressor at or above the predetermined pressure.

Next, referring to FIG. 8, a modification of the EGR stop control routine will be described. The EGR stop control routine shown in FIG. 8 is periodically executed at predetermined intervals during operation of the engine 1 in parallel with other control routines executed by the ECU 20. It should be noted that in FIG. 8, the operations that are similar to those of FIGS. 2A, 2B, 3A and 313 are denoted by the same reference numerals, and description thereof may not be repeated.

In the control routine shown in FIG. 8, in step S12, the ECU 20 acquires the operating state of the engine 1. Thereafter, in step S32, the ECU 20 determines whether the EGR execution condition is satisfied. If it is determined that the EGR execution condition is not satisfied, the present control routine ends. On the other hand, if it is determined that the EGR execution condition is satisfied, the opening degree of the throttle valve 7 is acquired in step S33, and then the target opening degree of the throttle valve 7 is calculated in step S34.

Figure 9:
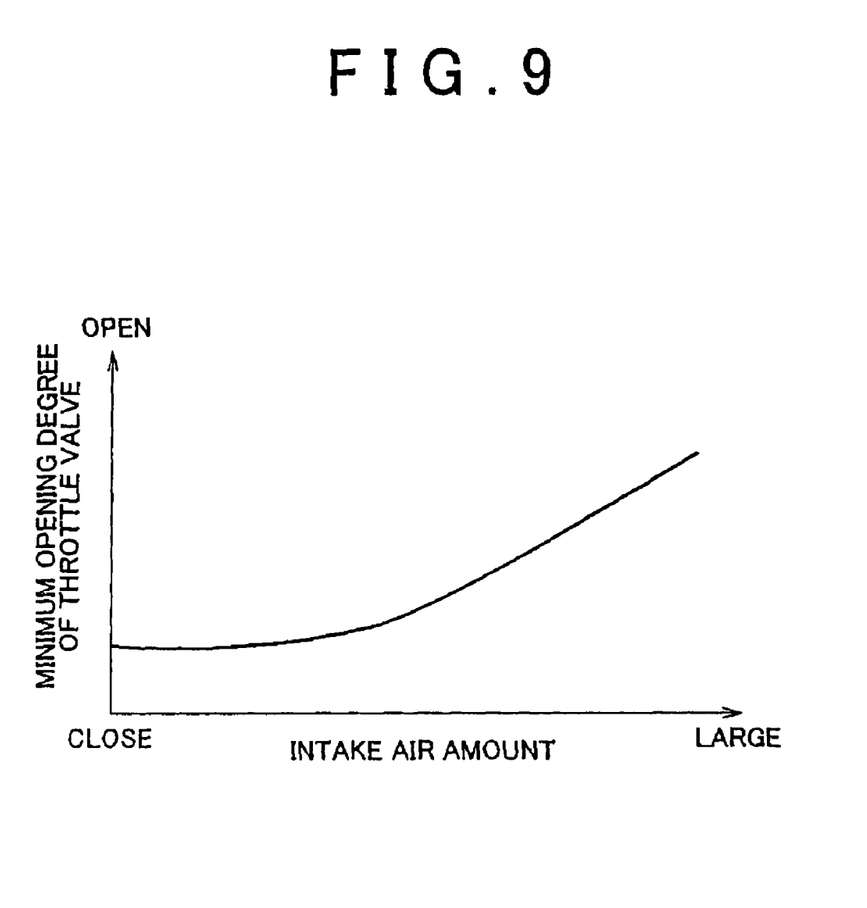
FIG. 9 is a diagram showing the relationship between the intake air amount and the minimum throttle-valve opening.

Next, in step S61, the ECU 20 sets a minimum opening degree of the throttle valve 7 based on the intake air amount of the engine 1. The minimum opening degree of the throttle valve 7 is an opening degree at which the throttle valve 7 should be opened before the EGR valve 13 is controlled closed such that the intake pressure upstream of the compressor is maintained at or above the predetermined pressure. When the intake air amount inducted before the EGR valve 13 is controlled closed is large, more exhaust gas is recirculated into the intake passage 3 as compared to when the intake air amount is small. Consequently, as the intake air amount inducted before the EGR valve 13 is controlled closed increases, the more amount of recirculated exhaust gas is decreased when the EGR valve 13 is fully closed. Therefore, in order to maintain the intake pressure upstream of the compressor at or above a predetermined pressure, as the intake air amount inducted before the EGR valve 13 is controlled closed increases, a larger intake air amount is required when the closing control for the EGR valve 13 is started. Accordingly, as the intake air amount inducted before the EGR valve 13 is controlled closed increases, a larger minimum opening degree of the throttle valve 7 is set. The minimum opening degree of the throttle valve 7 is set with reference to a map in the ROM of the ECU 20 where the relationship shown in FIG. 9 is stored, for example. The ECU 20, in executing step S61, may be regarded as the "second minimum opening degree setting means" in accordance with the present invention.

Next, in step S62, the ECU 20 determines whether the minimum opening degree of the throttle valve 7 is larger than the target opening degree of the throttle valve 7. If it is determined that the target opening degree of the throttle valve 7 is equal to or larger than the minimum opening degree of the throttle valve 7, the operation proceeds to step S35, and the ECU 20 controls the opening degree of the throttle valve 7. On the other hand, if it is determined that the target opening degree of the throttle valve 7 is smaller than the minimum opening degree of the throttle valve 7, the operation proceeds to step S63, and the ECU 20 substitutes the minimum opening degree of the throttle valve 7 for the target opening degree of the throttle valve 7. Thus, the throttle valve 7 may be opened to the minimum opening degree thereof. Thereafter, the operation proceeds to step S35, and the ECU 20 controls the opening degree of the throttle valve 7.

After the opening degree of the throttle valve 7 is controlled in step S35, the operation proceeds to step S64, and the ECU 20 determines whether, the opening degree of the throttle valve 7 is equal to or larger than the minimum opening degree thereof. If it is determined that the opening degree of the throttle valve 7 is less than the minimum opening degree thereof, the operation proceeds to step S43, and the ECU 20 keeps the throttle valve closing flag OFF state. Thereafter, the operation returns to step S64, and the operation of steps S64 and S43 is repeated until the opening degree of the throttle valve 7 is equal to or larger than the minimum opening degree thereof. Thus, the EGR valve 13 remains open until the opening degree of the throttle valve 7 is equal to or larger than the minimum opening degree thereof. On the other hand, if it is determined that the opening degree of the throttle valve 7 is equal to or larger than the minimum opening degree thereof, the operation proceeds to step S42, and the ECU 20 switches the throttle valve closing flag to ON state. Thereafter, the present control routine ends.

In the EGR stop control routine shown in FIG. 8, the EGR valve 13 remains open until the opening degree of the throttle valve 7 is equal to or larger than the minimum opening degree thereof. It is thus possible to suppress an excessive drop in the intake pressure upstream of the compressor, and more reliably maintain the intake pressure upstream of the compressor at or above the predetermined pressure.

The present invention is not limited to the above-described modes, but may also be implemented in various other modes. For example, the present invention may be applied to an internal combustion engine in which a portion of exhaust gas is recirculated from an exhaust passage upstream of the turbine to an intake passage upstream of the compressor. Furthermore, the present invention may also be applied to an internal combustion engine that includes a first EGR passage through which a portion of exhaust gas from an exhaust passage downstream of the turbine is recirculated to an intake passage upstream of the compressor, and a second EGR passage through which a portion of exhaust gas from an exhaust passage upstream of the turbine is recirculated to an intake passage downstream of the compressor. The predetermined pressure with respect to the intake pressure upstream of the compressor may be set as appropriate in accordance with the configuration of the internal combustion engine equipped with the present invention. For example, the intake pressure upstream of the compressor may be set to a pressure that may suppress a fluctuation in the torque of an internal combustion engine when the exhaust gas recirculation is started or stopped.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

The invention claimed is:

1. An exhaust gas recirculation system for an internal combustion engine, comprising:
    a turbocharger that includes a compressor and a turbine;
    a throttle valve, provided in an intake passage upstream of the compressor;
    an exhaust gas recirculation passage through which a portion of exhaust gas flowing in an exhaust passage is recirculated to a intake passage between the throttle valve and the compressor;
    an exhaust gas recirculation valve that regulates a flow rate of exhaust gas flowing in the exhaust gas recirculation passage;
    a valve control unit that controls an opening degree of the throttle valve and an opening degree of the exhaust gas recirculation valve so that pressure in the intake passage between the throttle valve and the compressor is maintained at or above a predetermined pressure; and
    a first minimum opening degree setting unit that sets a minimum opening degree of the exhaust gas recirculation valve based on an intake air amount of the internal combustion engine,
    wherein the valve control unit closes the throttle valve after the exhaust gas recirculation valve is opened, and
    wherein, when the exhaust gas is recirculated, the valve control unit opens the exhaust gas recirculation valve, and then closes the throttle valve after the exhaust gas recirculation valve has been opened to at least the minimum opening degree when an exhaust gas recirculation execution condition is satisfied.

2. The exhaust gas recirculation system according to claim 1, wherein the valve control unit controls the opening degree of the throttle valve and the opening degree of the exhaust gas recirculation valve such that at least one of the throttle valve and the exhaust gas recirculation valve remains open.

3. The exhaust gas recirculation system according to claim 1, further comprising start-delay time setting unit that sets a start-delay time of the exhaust gas recirculation based on an intake air amount of the internal combustion engine,
    wherein, when the exhaust gas is recirculated, the valve control unit opens the exhaust gas recirculation valve, and then closes the throttle valve after the start-delay time of the exhaust gas recirculation has elapsed.

4. The exhaust gas recirculation system according to claim 3, wherein
    the start-delay time setting unit sets the start-delay time of the exhaust gas recirculation longer as the intake air amount of the internal combustion engine increases.

5. The exhaust gas recirculation system according to claim 1, wherein the first minimum opening amount setting unit sets the minimum opening degree of the exhaust gas recirculation valve larger as the intake air amount of the internal combustion engine increases.

6. The exhaust gas recirculation system according to claim 1, wherein the exhaust gas recirculation passage is provided between the exhaust passage downstream of the turbine and the intake passage upstream of the compressor.

7. The exhaust gas recirculation system according to claim 1, wherein the exhaust gas recirculation passage is provided between the exhaust passage upstream of the turbine and the intake passage upstream of the compressor.

8. The exhaust gas recirculation system according to claim 1, wherein the exhaust gas recirculation passage includes the first exhaust gas recirculation passage that is provided between the exhaust passage downstream of the turbine and the intake passage upstream of the compressor, and the second exhaust gas recirculation passage that is provided between the exhaust passage upstream of the turbine and the intake passage downstream of the compressor.

9. The exhaust gas recirculation system according to claim 1, wherein the predetermined pressure is a pressure that prevents oil leaks from an oil seal portion provided within a housing of the compressor.

10. The exhaust gas recirculation system according to claim 1, wherein the predetermined pressure is a pressure that prevents over-speed of a rotary shaft that connects the compressor to the turbine.

11. The exhaust gas recirculation system according to claim 1, wherein the predetermined pressure is an intake pressure upstream of the compressor that suppresses fluctuation in torque of the internal combustion engine when the exhaust gas recirculation is started or stopped.

12. An exhaust gas recirculation system for an internal combustion engine, comprising:
    engine, comprising:
    a turbocharger that includes a compressor and a turbine;
    a throttle valve, provided in an intake passage upstream of the compressor;
    an exhaust gas recirculation passage through which a portion of exhaust gas flowing in an exhaust passage is recirculated to a intake passage between the throttle valve and the compressor;
    an exhaust gas recirculation valve that regulates a flow rate of exhaust gas flowing in the exhaust gas recirculation passage;
    a valve control unit that controls an opening degree of the throttle valve and an opening degree of the exhaust gas recirculation valve so that pressure in the intake passage between the throttle valve and the compressor is maintained at or above a predetermined pressure; and
    a second minimum opening degree setting unit that sets a minimum opening degree of the throttle valve based on the intake air amount of the internal combustion engine,
    wherein the valve control unit closes the exhaust gas recirculation valve after the throttle valve is opened, and
    wherein, when the exhaust gas recirculation is stopped, the valve control unit opens the throttle valve, and then closes the exhaust gas recirculation valve after the throttle valve has been opened to at least the minimum opening amount when an exhaust gas recirculation stop condition is satisfied.

13. The exhaust gas recirculation system according to claim 12, further comprising stop-delay time setting unit that sets stop-delay time of the exhaust gas recirculation based on the intake air amount of the internal combustion engine,
  wherein, when the exhaust gas recirculation is stopped, the valve control unit opens the throttle valve, and then closes the exhaust gas recirculation valve after the stop-delay time of the exhaust gas recirculation has elapsed.

14. The exhaust gas recirculation system according to claim 13, wherein the stop-delay time setting unit sets the stop-delay time of the exhaust gas recirculation longer as the intake air amount of the internal combustion engine increases.

15. The exhaust gas recirculation system according to claim 12, wherein the second minimum opening setting unit sets the minimum opening degree of the throttle valve larger as the intake air amount of the internal combustion engine increases.

* * * * *